April 24, 1962 O. T. McILVAINE 3,031,351
LIGHT CONTROL DEVICES AND METHODS OF MANUFACTURING SAME
Filed Feb. 18, 1957
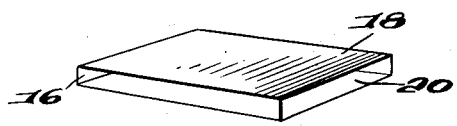
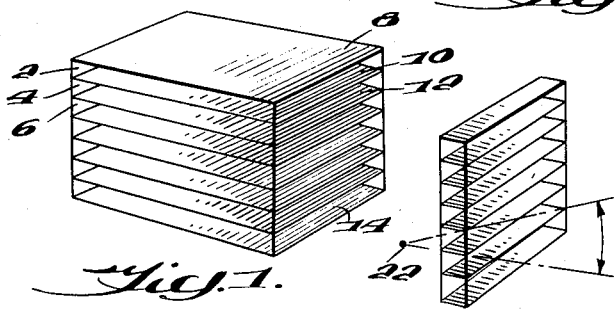
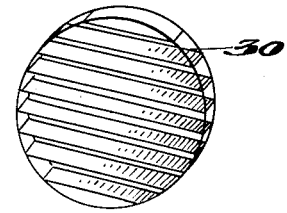
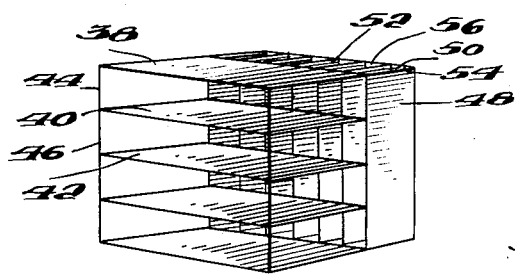
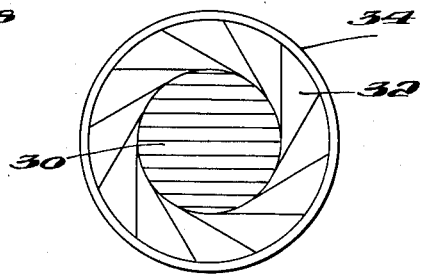
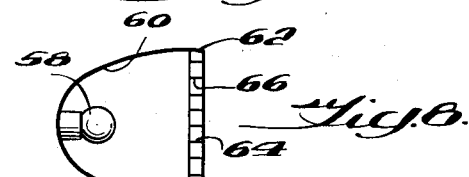
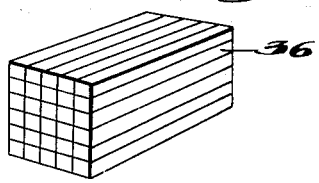
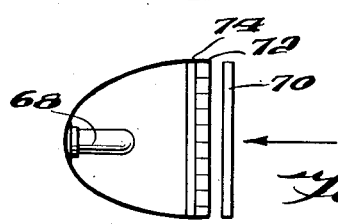
INVENTOR
ORAN T McILVAINE
BY Swecker & Mathis
ATTORNEYS

United States Patent Office 3,031,351
Patented Apr. 24, 1962

3,031,351
LIGHT CONTROL DEVICES AND METHODS
OF MANUFACTURING SAME
Oran T. McIlvaine, St. Charles, Ill.
(% Photo-Crystals, Inc., 15 S. 1st St., Geneva, Ill.)
Filed Feb. 18, 1957, Ser. No. 640,971
3 Claims. (Cl. 250—237)

The present invention concerns light control devices and methods of manufacturing same. More particularly, the invention concerns louvers to control the direction of admission of light.

The prior art includes light control devices such as Fresnel lenses, polarizing lenses, and louvers such as Venetian type blinds. All of these devices may be used to control the direction and/or the amount of light transmitted. However, they all have limitations which restrict their uses for the objects set forth in detail hereinafter.

Polarizing lenses are of limited utility since they are primarily intensity control devices, and are not selective as to direction. No matter what direction the light comes from, it will be polarized and its intensity will be reduced by about the same amount.

Fresnel lenses can be made somewhat selective both as to the direction of the light and the intensity transmitted. The selectivity in regard to direction is not sufficiently good to provide the accurate control of light necessary for the proper activation of the photocell illustrated in connection with the instant invention.

Louvers, such as Venetian blinds, which have a separate embodiment from lenses, are generally too fragile for the purpose of the invention and do not provide sufficient control.

It is an object of this invention to overcome the disadvantages of the prior art devices and produce a more effective light control device.

It is a further object of this invention to produce light control devices which will overcome the limitations of the prior art, and provide an accurate means for controlling the angle of acceptance or the angle at which light is admitted for transmission through a transparent body.

It is also an object of this invention to provide a method of making light control devices or louvers of this character.

Another specific object of this invention is to provide a louver to control the direction of admittance of light for a headlight control circuit, such as is illustrated in my copending applications, Serial No. 424,656, filed April 21, 1954, now Patent No. 2,884,564, granted April 28, 1959, and Serial No. 451,843, filed August 24, 1954, now Patent No. 2,807,752, granted September 24, 1957.

The foregoing objects and others ancillary thereto, I prefer to accomplish in the following manner:

According to a preferred embodiment of my invention, suitable transparent sheets of glass or plastic have their respective faces covered with opaque materials and are placed face-to-face like a sandwich. The opaque material may be alternated with reflecting material if desired. The sandwich or block of material is then cut in a direction perpendicular to the faces of the original sheets to form laminated sheets with bands of transparent material the width of the thickness of the original sheets and with narrow opaque planes between.

This preferred embodiment of the invention, together with modifications thereof, is set forth in the accompanying drawings, in which:

FIG. 1 is a perspective view of a representative stack of transparent sheets, the faces of which are opaque;

FIG. 2 is a perspective view of a single sheet with an opaque face;

FIG. 3 is a perspective view of a laminated sheet cut from the stack shown in FIG. 1;

FIG. 4 is a perspective view of a sheet such as is shown in FIG. 3, which has been trimmed to form a disc;

FIG. 5 is a view illustrating the disc in FIG. 4 in combination with an iris diaphragm and a bezel to control the diaphragm;

FIG. 6 is a perspective view of a composite block similar to that shown in FIG. 1, made up of long blocks with square or rectangular cross sections instead of sheets;

FIG. 7 is a perspective view of an embodiment in which two or more laminated sheets, such as are shown in FIG. 3, may be employed together;

FIG. 8 is a cross section illustrating the application of this device to a headlight; and FIG. 9 is a cross section of a unit showing the employment of a photocell with a filter and a louver of the kind herein disclosed.

Referring now more particularly to FIGS. 1 and 2, the numerals 2, 4, 6 and 16 designate transparent sheets of various materials. These sheets may be composed of plastic, glass, quartz, or any other desired material which will permit the passage of a desired band of radiant energy.

Interspersed between the transparent sheets are opaque layers such as 10 and 12, which may be layers of black paint on the faces of the sheets, metal sheets, or any other suitable material. It is generally desirable to keep these opaque layers as thin as possible in the interest of efficient transmittal. Suitable opaque layers are also provided at 8 and 14, at the top and bottom of the stack. The sheets are fastened together by cementing, welding, fusing, or any other means appropriate to the transparent sheets and opaque layers. Cementing will work well on plastics and fusing on glass, for example.

FIG. 2 illustrates the application of a single opaque layer 18 to a sheet of transparent material 16. Generally, a single opaque layer would be all that is required between the transparent sheets in FIG. 1. A second layer or coating could be applied at the other face 20 of the sheet 16, if desired. Such a second layer might display different absorption characteristics, or be a reflecting surface.

The embodiment shown in FIG. 3 is a laminated sheet such as may be made by cutting a slice from the face of the laminated block of FIG. 1 through the composite layers thereof. The thickness of this sheet may be varied to vary the angle at which light will be admitted through the faces, the thicker the block, the smaller the angle of admittance X for a given point 22.

The disc 30 in FIG. 4 results when the corners of a laminated sheet, such as that shown in FIG. 3, are trimmed by any suitable means. The disc shape is generally more useful than is the square cornered sheet, and may be so formed if desired.

The laminated sheet in FIG. 3 and the disc in FIG. 4 are useful to cut down the angle from which light may be received. The intensity of the light admitted is not subject to variation by these devices, however, once they are formed. The only way the intensity of the light can be varied using these devices alone is by turning them to change the angle of acceptance which may then result in the admission of other undesirable light. The embodiment in FIG. 5 will permit the use to vary the intensity of the light admitted or accepted by the laminated sheets or discs, without affecting the direction from which the light is received. This is done by varying the aperture of the iris 32 by turning the bezel 34.

An embodiment which limits the acceptance angle in planes perpendicular to each other is illustrated in FIG. 6. In this figure, long blocks, such as 36, having polygonal cross sections, such as a square or a rectangle, have their sides coated with opaque material, and are fastened together or cemented together in stacks, as was done in FIG. 1. The result can be seen to limit the light transmitted to a narrow angle in all directions.

The embodiment shown in FIG. 7 is designed to provide control of the light admitted from the horizontal and the vertical plane. The angle of acceptance from the vertical plane is limited by opaque layers, such as 38, 40 and 42, with transmission taking place through thick transparent layers such as 44 and 46. The angle of acceptance from the horizontal plane is limited by opaque layers, such as 48, 50 and 52, while transmission is through such thin transparent layers as 54 and 56.

An embodiment such as that shown in FIG. 7 is particularly useful in connection with headlight dimmer circuits, such as those in my co-pending application which were previously mentioned. By placing the opaque planes 38, 40 and 42 relatively far apart, and opaque planes 48, 50 and 52, relatively close together, the unit is made more selective in the horizontal plane than in the vertical. This is desirable where it is the purpose of the unit to prevent light from the side, such as road lights, from adversely affecting the response to lights straight ahead, or slightly elevated.

In FIG. 8 is shown a cross section of a headlight with a light source 58, reflector 60, and a louver, of the type shown in FIGS. 3 and 4, at 62. This louver would be one of those in which different coatings would be placed on the top and on the bottom of each sheet; for example, the bottom of each sheet would have an absorbing layer such as 64, and the top of each sheet would have a reflecting layer such as 66. Thus, light would be reflected by the upper layer 66 downward, and little light would be reflected upward.

The cross section shown in FIG. 9 is of a unit similar in shape to the headlight of FIG. 8, but with a photocell at 68 which is sensitive to light from the direction of the arrow through the unit indicated at 70, and laminated layers 72 and 74. The unit 70 may be an infrared or other type of filter, or the iris and bezel 32 and 34 of FIG. 5. The laminated sheet 72 corresponds to the horizontally oriented sheet in FIG. 7, and the sheet 74 corresponds to the vertically oriented sheets of FIG. 7, composed of opaque layers such as 48, 50 and 52, and transparent sheets 54 and 56. The unit 70 and laminated sheet 72 might be eliminated if desired.

For use in a dimmer circuit, such as is proposed with regard to FIG. 9 above, plastic sheets painted with black paint have proven very satisfactory. One face of each sheet is painted and dried, the sheets are then stacked in a pile, such as in FIG. 1, with a suitable binder or plastic solvent between sheets, and the resulting stack is pressed to assure a firm seal as the sheets are cemented together.

When the stack has set in permanent form, a strip of the desired thickness is sliced off, as indicated in FIG. 3, and round pieces, such as shown at FIG. 4, can then be punched or otherwise formed therefrom.

The acceptance angle, or the angle at which incident light will pass through the transparent sheet, may be varied by changing the thickness of the sheet or the closeness of the opaque strips. If the sheet is made thicker, the acceptance angle tends to get smaller. If the opaque strips are placed closer together, the acceptance angle tends to get smaller.

For use with a headlight, the block in FIG. 1 and the sheet in FIG. 3 could be of glass. With glass, a metal coating could be evaporated onto the surfaces. A thin metal foil might be used in instances in which a relatively thick layer of opaque material is not objectionable. Two coatings one bright and reflecting for the upper surfaces, and one dark and absorbing for the lower surfaces, would be desirable. The glass plates would be placed together with the bright coatings adjacent to the dark ones, and the whole fired in a furnace and fused together.

With bright upper surfaces, as indicated at 66 in FIG. 8, and dark lower faces as indicated at 64 in FIG. 8, the light from the bulb 58 will be reflected from the surfaces 66 down on the road, but will not be reflected upward into the eyes of oncoming motorists by the surfaces 64.

The construction shown presents a means of limiting the directions from which light will be allowed to pass through a transparent body. This means is simple to construct, inexpensive, and very effective.

A chief advantage of the construction is the fact that the thin opaque layers between the transparent layers serve to prevent the transfer of undesired light, but are at the same time so thin that they are prevented from absorbing or obstructing more than an insignificant amount of the desired light.

Although I have shown and described particular embodiments of my invention, it is apparent that many variations thereof are possible. My invention, therefore, is not to be restricted except insofar as is necessitated by the prior art and by the appended claims.

I claim:

1. A light-sensitive device comprising a reflector, a light-responsive device, means mounting the light-responsive device within the reflector, a louver, means mounting the louver across the open end of the reflector, said louver comprising a plurality of thin sheets of transparent material having thin layers of opaque light-absorbing matter spaced at regular intervals perpendicular to the faces of each transparent sheet and extending through the sheet, the layers of one of the sheets being oriented in a horizontal plane and the layers of the adjacent sheet oriented in a vertical plane, the louver acting to restrict the light entering the reflector to a narrow angle.

2. A light-sensitive device comprising a reflector, a light-responsive device, means mounting the light-responsive device within the reflector, a louver, means mounting the louver within the reflector, said louver comprising a plurality of thin sheets of transparent material having thin layers of opaque light-absorbing matter spaced at regular intervals perpendicular to the faces of each transparent sheet and extending through the sheet, the layers of one of the sheets being oriented in a horizontal plane and the layers of the other sheet oriented in a vertical plane and having a greater separation than the layers in the horizontally oriented sheet, the louver acting to restrict the light entering the reflector to a more narrow angle in the vertical plane than in the horizontal plane.

3. In a method for making light-control devices, the steps comprising coating one face of each of a plurality of thin transparent sheets with light-absorbing material, cementing several such coated sheets together to form a stack, cutting the stack in a direction perpendicular to the face of the light-absorbing material to form laminated sheets, and placing a relatively thick laminated sheet face to face with a thin laminated sheet so that the laminations in one sheet are perpendicular to those in the other sheet, and cementing the sheets together.

(References on following page)

References Cited in the file of this patent

UNITED STATES PATENTS

| | | |
|---|---|---|
| 622,506 | Manning | Apr. 4, 1899 |
| 1,176,313 | Pfund | Mar. 21, 1916 |
| 1,687,119 | Benson et al. | Oct. 9, 1928 |
| 1,981,703 | Monro | Nov. 20, 1934 |
| 2,038,831 | Erlach | Apr. 28, 1936 |
| 2,053,173 | Astima | Sept. 1, 1936 |
| 2,254,022 | Whitaker | Aug. 26, 1941 |
| 2,314,363 | Moulton | Mar. 23, 1943 |
| 2,319,534 | Crowley | Mar. 18, 1943 |
| 2,413,660 | Stearns | Dec. 31, 1946 |
| 2,652,660 | Kurz | Sept. 22, 1953 |
| 2,744,999 | Arnejo | May 8, 1956 |
| 2,798,147 | Orsatti | July 2, 1957 |
| 2,834,874 | Henchoz et al. | May 13, 1958 |